Sept. 9, 1958 E. J. MARTIN 2,850,870

BI-METALLIC BOURDON TUBE

Filed July 25, 1952

Inventor
Edward J. Martin
By Willits, Helwig & Baillio
Attorneys

United States Patent Office 2,850,870
Patented Sept. 9, 1958

2,850,870

BI-METALLIC BOURDON TUBE

Edward J. Martin, Pleasant Ridge, Mich., assignor to General Motors Corporation, Detroit, Mich., a corporation of Delaware Application July 25, 1952, Serial No. 300,991

5 Claims. (Cl. 60—23)

This invention relates to motive or driving means and more particularly to motive means in which the driving means is actuated by changes in temperature such as might be termed a heat motor. There are many instances where driving means moved relatively slowly and over only a limited distance can be advantageously utilized for economically providing power. An example of such a drive might be a heat motor to maintain a spring motor wound such as a clock motor. In automotive vehicles various systems have been devised for continuously operating clocks so that it is not necessary for the operator to wind the same. Since electricity is the main source of energy available at all times in the vehicle, most forms have utilized electrical means as the basic driving force. It is my intention to provide a simple and novel construction utilizing electrically supplied heat to drive a member, which power is utilized to maintain a clock spring motor wound.

It is an object in making this invention to provide a simple heat operated driving means.

It is a further object in making this invention to provide an efficient electrically heated driving means.

It is a still further object in making this invention to provide a periodically heated bi-metal motor for driving purposes.

It is a still further object in making this invention to provide a driving element that is actuated by both temperature and internal pressure changes.

It is a still further object in making this invention to provide a driving element which combines the action of an expanding pressure tube and a bi-metal member to actuate the same.

With these and other objects in view which will become apparent as the specification proceeds, my invention will be best understood by reference to the following specification and claims and the illustrations in the accompanying drawings, in which:

The driving unit or tube consists of a hollow, bowed or arcuate member fabricated of two halves of metal, which parts have different rates of expansion, so that upon temperature change the tube will tend to either straighten out or curl further up, depending on whether the ambient temperature increases or decreases. By mounting a heating element within the hollow tube practically all of the heat is conducted directly to the walls of the tube and very little is lost, making the unit very efficient. One end of the arcuate tube is anchored and the movement of the free end is used both to drive the desired parts and to alternately switch the heating means on and off to provide reciprocation of the free end.

Figure 1:
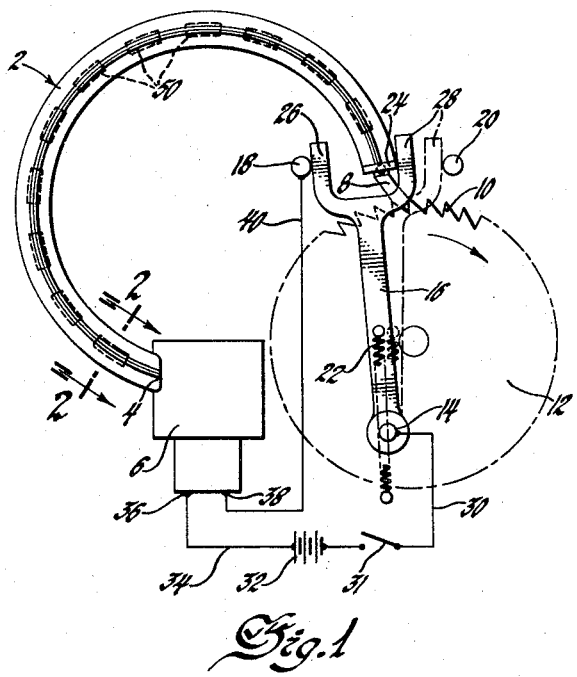
Figure 1 is a diagrammatic showing of a heat motor and associated supply system and driven means which embodies my invention.

With this general description, reference will now be specifically made to Figure 1 in which there is shown the main driving tube or unit 2 fixedly supported at 4 on a base 6. The free end of the unit or tube pivotally carries a dog or pawl 8 which, when in assembled position, engages the teeth 10 of a driving wheel 12 which is connected to intermittently drive any desired part, such for example as the winding shaft of a clock motor. Axially displaced from the driving wheel and pivotally mounted as at 14 on an independent support is a switching arm 16 which oscillates between two fixed contacts 18 and 20 and which is provided with a snapover center bias through spring 22 connected to the arm and to a stationary support. The arm remains in a given position against one of the contacts 18 or 20 until it is positively moved over center in the opposite direction by lateral movement of extension 24. Upon movement slightly over center spring 22 will move the arm to engage the other contact.

The switch arm 16 is moved by a lateral extension 24 on the free end of the unit 2 which projects between the two fingers 26 and 28 on the upper end of the arm 16. Arm 16 is formed of electrically conductive material and conductive line 30 is secured to the arm adjacent its pivot 14. Line 30 is also connected to a source of power such as a battery 32 through an off-on switch 31. The opposite terminal of the battery is connected through line 34 to a terminal 36 on the base 6 to which is internally connected to one end of a heating coil to be described. The second terminal 38 on the base, to which is internally connected the other end of the heating coil, is connected through wire 40 with stationary contact 18. Contact 20 is unconnected electrically and merely acts as a mechanical stop.

The driving unit or tube 2 is fabricated through the assembly of two halves 42 and 44 which have different rates of expansion similar to conventional bi-metallic means. They are so formed as to provide a hollow interior 46 within which a heating coil 48 may be located. The heating coil 48 extends throughout the entire length of the tube 2 and is supported therein by a series of spaced blocks 50 of insulating material to keep the coil from contact with the unit but permit the tube to flex. Additional insulating members 52 space the return wire from the coil. Since the heating coil 48 is entirely enclosed within the tube, all of the heat generated by electrical current is transmitted through the tube walls to cause it to flex and the unit is therefore very efficient.

In the operation of the device, when at rest, the unit is at room temperature and the free end assumes its position, wherein the finger 26 engages contact 18 and no current flows through the heating coil 48 since the switch 31 is open. Upon placing the device in service, the switch 31 is closed, completing an obvious circuit through the heating coil. As the temperature of the tube is raised, the free end starts to move to the right. Pawl 8 carried by tube 2 is in engagement with teeth 10 of the wheel 12 and this movement of the free end to the right will therefore drive the wheel 12 in a clockwise direction, as seen in Figure 1. This provides the driving or winding force. As the free end of the tube continues the advance, the lateral member 24 thereon will engage finger 28 and move arm 16 to the right until it snaps over center, which is only a relatively small distance of actual movement, thus breaking the circuit to the heating coil and permitting the unit to cool. As the unit cools, the free end will be returned to the left, the dog or pawl 8 ratcheting over the teeth 10, suitable means (not shown) being provided to prevent the wheel 12 from turning in a counterclockwise direction. When the unit has cooled to a given extent, lateral member 24 will now engage finger 26, causing the switch to return to its left hand position, reengaging contact 18 to complete the electrical circuit and recycle the unit. This action is maintained as long as the switch 31 is closed, and if the device is applied to winding an automotive clock, would be continuously energized to maintain the clock wound. It is obvious that the heat applied is with the expenditure of a minimum amount of electrical energy.

A Bourdon tube is a well-known type of mechanical operator actuated by internal pressure change. It likewise is an arcuate or curved tube in which, as the pressure increases, the tube tends to assume a straightened-out position. The ends of my tube 2 may, if desired, be closed so that the internal pressure may be increased as the temperature rises, which action will add to the force tending to move the free end.

Figure 3:
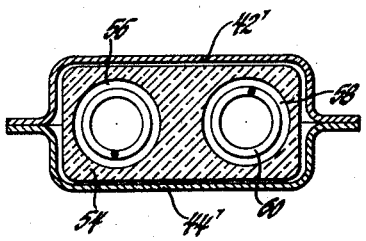
Figure 3 is a cross-sectional view similar to Figure 2 of a modified form of driving unit.
Figure 4:
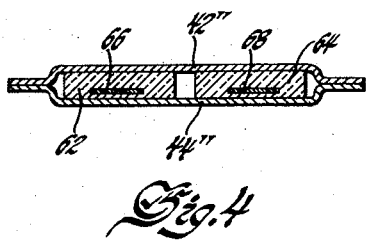
Figure 4 is a similar cross-sectional view of a further modified form.
Figure 5:
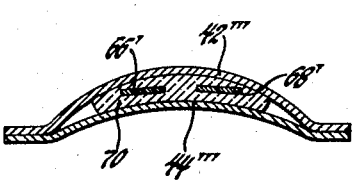
Figure 5 is a similar cross-sectional view of a still further modified form of driving unit.

The actual cross-sectional configuration of the tube may assume a large number of different shapes without departing from the spirit of my invention, and examples of some of these are illustrated in Figures 3, 4 and 5. In Figure 3 the members 42' and 44' are formed with rectangular sections instead of arcuate, and when assembled together provide a rectangular opening through the tube. Within the tube there are located a series of spaced ceramic insulators 54 conforming to the shape of the tube and having two circular openings 56 and 58 therein for supporting a continuous heating coil 60, which coil proceeds outwardly in the tube through one set of openings, for example 56, and returns through the opposite set to the base 6.

Figure 4 shows further modification having a cross-sectional shape similar to that of Figure 3, but much smaller in section. Individual insulators 62 and 64 are flat to conform to the opening within which they must lie and may be slid on the flat heating conductors 66 and 68 like beads. In assembled position they lie between the two halves 42'' and 44'' of the tube to maintain the heating conductors from contact with the inner surface thereof.

Figure 2:
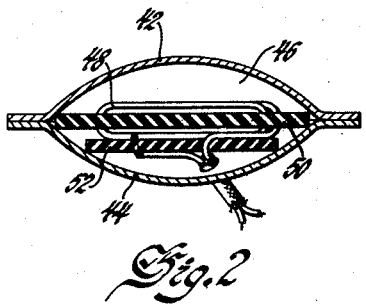
Figure 2 is an enlarged sectional view taken on line 2—2 of Figure 1.

Figure 5 illustrates a still further modification in which the two halves 42''' and 44''' are arcuate sections similar to Figure 2 but one, namely 44''', has a larger radius than the other, and is nested within the upper to form a smaller chamber. A plurality of insulating members 70 support the flat heating conductors 66' and 68' in this instance. This configuration has been found to provide a design which is very sensitive to either changes in temperature or internal pressure and is also economical in the use of insulating material supporting the conductors 66' and 68'.

It will thus be evident that I have provided a simple, efficient heat motor which is capable of being fabricated in a number of different cross-sectional configurations, and which, when intermittently heated, will provide movement for accomplishing work.

I claim:

1. In a heat motor, an elongated curved hollow bi-metallic member anchored at one end, said metals having different thermal rates of expansion, heating means mounted within the member to change the temperature thereof and cause it to change its shape, and closure means for the ends of the member enclosing fluid therein so that both fluid pressure changes within the member caused by temperature changes and bi-metallic action cause the free end of the member to move upon heat change.

2. In a heat motor an elongated curved hollow tubular bi-metallic member having air therein whose ends are sealed, means for mounting the same so that one end is free to move, heating means mounted within the tubular member so that upon application of heat both the change in pressure of the air and the bi-metallic action of the member will combine to cause the member to change shape and move the end, and switching means connected to the heating means to control alternate energization periods of the heating means, said switching means being mounted adjacent the free end of the member and actuated by movement thereof.

3. In a drive unit for a heat motor, a composite elongated sealed hollow member having air therein formed of a plurality of parts of arcuate cross-section of differing radii nested together of materials having differing thermal rates of expansion and heating means mounted within said member.

4. In a drive unit for a heat motor, a composite elongated sealed hollow member having air therein formed of a plurality of parts of arcuate cross-section of differing radii nested together of materials having differing thermal rates of expansion, a plurality of insulating blocks having a configuration to fit within the hollow member mounted in spaced relation therein and having openings therethrough and a heating element passing through the openings and carried by said blocks.

5. In a heat motor, a hollow elongated member formed of complementary parts having different thermal rates of expansion and sealed at its ends, fluid means within said hollow member, heating means mounted within said hollow member to heat the same and cause a change in configuration thereof due to the differing rates of thermal expansion of the parts and the change in internal pressure with temperature changes, means for fixedly mounting one end of the member, overcenter switching means mounted adjacent the free end of the member and engageable thereby to actuate the same, and movable driven means also engageable by the free end of the member to drive the same upon movement of the member, said heating means being connected to said switching means and controlled thereby to alternately energize and deenergize the same.

References Cited in the file of this patent

UNITED STATES PATENTS

| Number | Name | Date |
|---|---|---|
| 393,132 | Wagner | Nov. 20, 1888 |
| 1,046,777 | Hadaway | Dec. 10, 1912 |
| 1,052,816 | Hadaway | Feb. 11, 1913 |
| 1,258,368 | Smith | Mar. 5, 1918 |
| 1,441,549 | Wells | Jan. 9, 1923 |
| 1,492,450 | Gregory | Apr. 29, 1924 |
| 1,676,921 | Phelan et al. | July 10, 1928 |
| 1,676,923 | Phelan et al. | July 10, 1928 |
| 1,881,884 | Noble | Oct. 11, 1932 |
| 1,882,726 | Atkins | Oct. 18, 1932 |
| 1,963,328 | Holinger | June 19, 1934 |
| 1,984,008 | Baker | Dec. 11, 1934 |
| 2,415,768 | Shaw | Feb. 11, 1947 |
| 2,451,840 | Lewandowski | Oct. 19, 1948 |
| 2,572,162 | Koonz | Oct. 23, 1951 |